UNITED STATES PATENT OFFICE.

MARK SHOELD, OF CHICAGO, ILLINOIS, ASSIGNOR TO ARMOUR FERTILIZER WORKS, OF CHICAGO, ILLINOIS, A CORPORATION OF NEW JERSEY.

PROCESS OF PRODUCING FERTILIZER.

1,375,115.   Specification of Letters Patent.   Patented Apr. 19, 1921.

No Drawing.   Application filed September 13, 1920.   Serial No. 409,867.

*To all whom it may concern:*

Be it known that I, MARK SHOELD, a citizen of the United States, residing at Chicago, in the county of Cook, State of Illinois, have invented certain new and useful Improvements in Processes of Producing Fertilizer, of which the following is a specification.

In the manufacture of mono-calcium-phosphate from phosphate-rock, as for example in the commercial production of ordinary baking-powder, a waste-product or refuse material results consisting of substantially impure di-calcium phosphate containing twenty-five per cent. to thirty per cent. of $P_2O_5$ on a dry basis. Such heretofore more or less useless by-product or wet precipitated phosphate comes in the form of a sludge containing 60 to 70 per cent. of water after draining, and the phosphorus pentoxid thereof is practically all available by the ammonium citrate method for fertilizer, the impurities consisting principally of iron and alumina. If it be attempted to dry such wet material for fertilizer purposes, the product is a very fine powder or dusty flocculent mass unsuited for such use, because it is readily borne or carried away by the slightest breeze or air currents. If a farmer were to use such dry dust in his drill as a fertilizer, most of it would be blown away and represent a loss.

The prime object and leading purpose of this invention is to provide a suitable and simple method of drying such material and freeing it from its dusty properties, supplying it nevertheless in fine and proper mechanical condition suitable for use as a fertilizer.

According to the new or improved process or method of this application, a certain amount of sulfuric acid is mixed with the wet precipitate phosphate, say for example ten to thirty per cent. by weight of dry material, whereupon the mixture is dried in any approved manner, as for instance in a direct heat rotary drier. The product is non-dusty and in good physical condition for employment as a fertilizer, being somewhat coarser than the dry, dusty, flocculent material referred to. It is, therefore, not subject to being blown away and lost and is well adapted for the intended use.

While I do not wish to be limited or restricted to any particular theory of chemical transformation which takes place in the mixture, it may be stated that the sulfuric acid is seemingly taken up by the alumina, and possibly a small amount of free phosphoric acid is formed, the resulting aluminum iron sulfate being of a more or less adhesive nature desirably preventing the dusting specified. Instead of using sulfuric acid, any appropriate sulfuric acid containing material may be employed, as for instance the niter-cake of commerce, the acid sodium sulfate of which contains in the neighborhood of thirty per cent. of sulfuric acid.

This invention is not necessarily limited to the precise and exact ingredients specified, nor to the amounts thereof employed, since both may be changed as circumstances dictate or require. Stated somewhat differently, those skilled in this art will understand that minor changes may be made in the process or method without departure from the substance and essence of the invention and without the sacrifice of any of its substantial benefits and advantages.

I claim:

1. The method of drying wet precipitated phosphate in a manner to prevent dusting thereof consisting in drying a mixture having as ingredients the wet precipitated phosphate and a material to prevent dusting thereof, substantially as described.

2. The method of drying wet precipitated phosphate in a manner to prevent dusting thereof consisting in drying a mixture having as ingredients the wet precipitated phosphate and a sulfuric acid containing material to prevent dusting thereof, substantially as described.

3. The method of drying wet precipitated phosphate in a manner to prevent dusting thereof, consisting in drying a mixture having as ingredients the wet precipitated phosphate and sulfuric acid to prevent dusting thereof, substantially as described.

4. The method of drying wet precipitated phosphate in a manner to prevent dusting thereof, consisting in drying a mixture having as ingredients the wet precipitated phosphate and sulfuric acid in the proportion of approximately ten to thirty per cent. of the latter by weight of dry material, substantially as described.

5. The method of drying a wet material in a manner to prevent dusting thereof, consisting in drying a mixture having as ingredients the wet material specified and a substance preventing dusting thereof, substantially as described.

MARK SHOELD.